US010348383B2

(12) United States Patent
Jeong et al.

(10) Patent No.: US 10,348,383 B2
(45) Date of Patent: Jul. 9, 2019

(54) METHOD AND APPARATUS FOR COMMUNICATING CHANNEL STATE INFORMATION IN FULL-DIMENSIONAL MIMO SYSTEM

(71) Applicant: Samsung Electronics Co., Ltd, Gyeonggi-do (KR)

(72) Inventors: Suryong Jeong, Gyeonggi-do (KR); Taeyoung Kim, Seoul (KR); Keonkook Lee, Gyeonggi-do (KR); Jiyun Seol, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 29 days.

(21) Appl. No.: 15/213,312

(22) Filed: Jul. 18, 2016

(65) Prior Publication Data

US 2017/0019162 A1    Jan. 19, 2017

(30) Foreign Application Priority Data

Jul. 16, 2015  (KR) .......................... 10-2015-0101216

(51) Int. Cl.
*H04B 7/06*        (2006.01)
*H04B 7/0413*    (2017.01)
(Continued)

(52) U.S. Cl.
CPC ......... *H04B 7/0626* (2013.01); *H04B 7/0413* (2013.01); *H04B 7/0632* (2013.01);
(Continued)

(58) Field of Classification Search
CPC ........................... H04L 5/0048; H04L 5/0053; H04L 5/0023; H04L 5/0057; H04L 1/0026;
(Continued)

(56) References Cited

U.S. PATENT DOCUMENTS

2012/0294228 A1*  11/2012  Song .................... H04W 88/04
                                                           370/315
2013/0021926 A1*   1/2013  Geirhofer ............ H04L 5/0048
                                                           370/252
(Continued)

FOREIGN PATENT DOCUMENTS

KR    10-2014-0038120       3/2014

OTHER PUBLICATIONS

Alcatel-Lucent Shanghai Bell, et al., "Performance of Rel 12 AAS for 3D UMa and 3D UMi Scenarios", 3GPP TSG RAN WG1 Meeting #79, R1-144706, San Francisco, California, Nov. 17-21, 2014, 5 pages.

*Primary Examiner* — Natasha W Cosme

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. A method and apparatus for transmitting/receiving Channel State Information (CSI) is provided for use in a Full Dimensional Multiple Input Multiple Output (FD-MIMO) system. A channel state information (CSI) reception for a base station according to the present disclosure for use in a wireless communication system includes transmitting CSI process configuration information to a terminal, transmitting a CSI Reference Signal (CSI-RS) to the terminal based on the CSI process configuration information, and receiving the CSI generated based on CSI-RS measurement result from the terminal, wherein the CSI process configuration information is configured to measure channel states of horizontal
(Continued)

and vertical antenna arrays, the CSI includes a joint Channel Quality Indicator (CQI), and the joint CQI is determined based on the CQIs for the horizontal and vertical antennas arrays.

16 Claims, 7 Drawing Sheets

(51) Int. Cl.
*H04L 5/00* (2006.01)
*H04B 17/318* (2015.01)
*H04B 17/345* (2015.01)

(52) U.S. Cl.
CPC .......... *H04L 5/0023* (2013.01); *H04L 5/0051* (2013.01); *H04L 5/0057* (2013.01); *H04B 17/318* (2015.01); *H04B 17/345* (2015.01); *H04L 5/0055* (2013.01)

(58) Field of Classification Search
CPC ....... H04L 5/0035; H04L 5/0051; H04L 1/00; H04L 1/0028; H04L 1/0031; H04L 25/0224; H04L 5/00; H04L 5/005; H04L 5/0094; H04L 12/189; H04L 1/0053; H04L 25/0204
USPC .......................................... 370/329
See application file for complete search history.

(56) References Cited

U.S. PATENT DOCUMENTS

2014/0078919 A1\* 3/2014 Hammarwall ................ 370/252
2014/0079149 A1   3/2014 Lee et al.

\* cited by examiner

METHOD AND APPARATUS FOR COMMUNICATING CHANNEL STATE INFORMATION IN FULL-DIMENSIONAL MIMO SYSTEM

CROSS-REFERENCE TO RELATED APPLICATION AND CLAIM OF PRIORITY

The present application is related to and claims the benefit under 35 U.S.C. § 119(a) of a Korean patent application filed on Jul. 16, 2015, in the Korean Intellectual Property Office and assigned Serial No. 10-2015-0101216, the entire disclosure of which is hereby incorporated by reference.

TECHNICAL FIELD

The present disclosure relates to a method and apparatus for transmitting/receiving Channel State Information (CSI) in a Full Dimensional Multiple Input Multiple Output (FD-MIMO) system.

BACKGROUND

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mm Wave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

The mobile communication system has evolved to a high-speed, high-quality wireless packet data communication system capable of providing data and multimedia services beyond the early voice-oriented services. The standardization organizations such as the $3^{rd}$ Generation Partnership Project (3GPP), the $3^{rd}$ Generation Partnership Project-2 (3GPP2), and the Institute of Electrical and Electronics Engineers (IEEE) have standardized $3^{rd}$ Generation mobile communication systems based on multicarrier multiple-access scheme.

Recently, various multicarrier-based mobile communication standards such as 3GPP Long Term Evolution (LTE), 3GPP2 Ultra Mobile Broadband (UMB), and IEEE 802.16m have been developed to meet the requirements of the high-speed, high-quality wireless packet data communication services.

The existing 3G wireless packet data communication systems such as LTE, UMB, and 802.16m operate based on multicarrier multiple access schemes and adopts various techniques such as MIMO, beamforming, Adaptive Modulation and Coding (AMC), and Channel-Sensitive Scheduling to improve the transmission efficiency.

The above techniques are capable of improving transmission efficiency and system throughput in such a way of adjusting data rate by concentrating transmission power to certain antennas according to the channel quality and transmitting data selectively to the user with a high channel quality. Since most of these techniques operate based on the CSI between a base station (BS) (hereinafter, interchangeably referred to as evolved Node B (eNB) and terminals (hereinafter, interchangeably referred to as User Equipment (UE) or Mobile Station (MS)), it is necessary for the base station or the terminal to measure the channel state therebetween using a reference signal such as Channel State Indication Reference Signal (CSI-RS).

The eNB is a transmitter in downlink and a receiver in uplink and capable of managing a plurality cells for communication. A mobile communication system is made up of a plurality of eNBs distributed geographically, and each eNB manages a plurality of cells to provide the UEs with communication service.

Existing 3G and 4G mobile communication systems represented by LTE/LTE-A adopt MIMO technique which uses a plurality transmission/receive antennas to increase data rate and system throughput. The MIMO technique makes it possible to transmit spatially-separated multiple information streams. This technique of transmitting multiple spatially-separated information streams is referred to as spatial multiplexing. Typically, the number of spatially-multiplexed information streams is determined depending on the numbers of transmit and receive antennas. The number of spatially-multiplexed information streams is referred to as rank of the corresponding transmission. The LTE/LTE-A Release 11 supports 8×8 MIMO spatial multiplexing and up to rank 8.

SUMMARY

However, measurement and report of the channel states between the plural transmit and receive antennas requires a large amount of resources and thus there is a need of a method to solve this problem.

To address the above-discussed deficiencies, it is a primary object to provide a method for a base station to receive channel state information (CSI) in a wireless communication system. The method includes transmitting CSI process configuration information to a terminal, transmitting a CSI Reference Signal (CSI-RS) to the terminal based on the CSI process configuration information, and receiving the CSI generated based on CSI-RS measurement result from the terminal, wherein the CSI process configuration information is configured to measure channel states of horizontal and vertical antenna arrays, the CSI includes a joint Channel Quality Indicator (CQI), and the joint CQI is determined based on the CQIs for the horizontal and vertical antennas arrays.

In accordance with another aspect of the present disclosure, a method for a terminal to transmit Channel State Information (CSI) in a wireless communication system is provided. The method includes receiving CSI processing configuration information from a base station, receiving a CSI Reference Signal (CSI-RS) generated based on the CSI process configuration information from the base station, and transmitting the CSI generated based on CSI-RS measurement result to the base station, wherein the CSI process configuration information is configured to measure channel states of horizontal and vertical antenna arrays, the CSI includes a joint Channel Quality Indicator (CQI), and the joint CQI is determined based on the CQIs for the horizontal and vertical antennas arrays.

In accordance with another aspect of the present disclosure, a base station for receiving Channel State Information (CSI) in a wireless communication system is provided. The base station includes a transceiver for transmitting and receiving signals to and from a terminal and a control unit which controls the transceiver to transmit CSI process configuration information to a terminal, transmit a CSI Reference Signal (CSI-RS) to the terminal based on the CSI process configuration information, and receive the CSI generated based on CSI-RS measurement result from the terminal, wherein the CSI process configuration information is configured to measure channel states of horizontal and vertical antenna arrays, the CSI includes a joint Channel Quality Indicator (CQI), and the joint CQI is determined based on the CQIs for the horizontal and vertical antennas arrays.

In accordance with still another aspect of the present disclosure, a terminal for transmitting Channel State Information (CSI) in a wireless communication system is provided. The terminal includes a transceiver for transmitting and receiving signals to and from a base station and a control unit which controls the transceiver to receive CSI processing configuration information from a base station, receive a CSI Reference Signal (CSI-RS) generated based on the CSI process configuration information from the base station, and transmit the CSI generated based on CSI-RS measurement result to the base station, wherein the CSI process configuration information is configured to measure channel states of horizontal and vertical antenna arrays, the CSI includes a joint Channel Quality Indicator (CQI), and the joint CQI is determined based on the CQIs for the horizontal and vertical antennas arrays.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
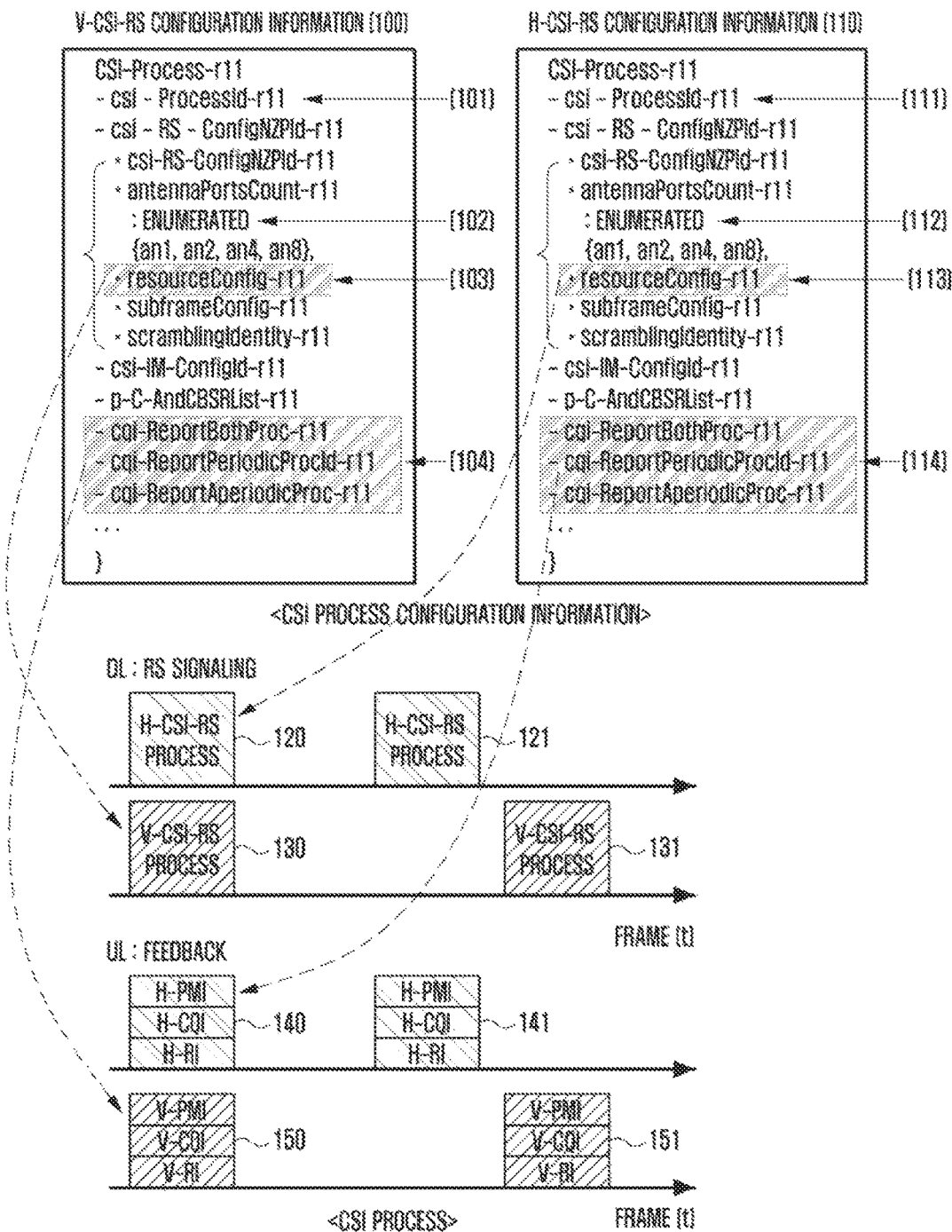
FIG. 1 is a diagram illustrating a method for estimating channels using the Kronecker-Product according to an embodiment of the present disclosure.

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged telecommunication technologies.

Exemplary embodiments of the present invention are described with reference to the accompanying drawings in detail. Detailed description of well-known functions and structures incorporated herein may be omitted to avoid obscuring the subject matter of the present invention. Further, the following terms are defined in consideration of the functionality in the present disclosure, and may vary according to the intention of a user or an operator, usage, etc. Therefore, the definition should be made on the basis of the overall content of the present specification.

Although the description is directed to the OFDM-based radio communication system, particularly the 3GPP E-UTRAN, it will be understood by those skilled in the art that the present disclosure can be applied even to other communication systems having the similar technical background and channel format, with a slight modification, without departing from the spirit and scope of the present disclosure.

Advantages and features of the present disclosure and methods of accomplishing the same may be understood more readily by reference to the following detailed description of exemplary embodiments and the accompanying drawings. The present disclosure may, however, be embodied in many different forms and should not be construed as being limited to the exemplary embodiments set forth herein. Rather, these exemplary embodiments are provided so that this disclosure will be thorough and complete and will fully convey the concept of the disclosure to those skilled in the art, and the present disclosure will only be defined by the appended claims. Like reference numerals refer to like elements throughout the specification.

As described above, the FD-MIMO system requires reference signals increasing in number in proportion to the number of TxRUs (interchangeably referred to as transceiver units or antenna ports) and channel feedback based thereon. However, legacy LTE release 12 standard restricts the number of TxRUs to 8 and thus there is a need of a method for supporting more than 8 TxRUs on the basis of the LTE release 12 standard.

In order to accomplish this, it can be possible to use more than one multiple CSI process. At this time, the CSI process abide by an LTE release earlier than release 12, and the UE identifies an independent antenna set per CSI process.

Table 1 shows detailed configuration information of the CSI process in the LTE release earlier than release 12. The CSI process configuration information is transmitted from an eNB to a UE.

TABLE 1

CSI-Process-r11
- csi-ProcessId-r11
- csi-RS-ConfigNZPId-r11
 * csi-rs-ConfigNZPId-r11
 * antennaPortsCount-r11
 :ENUMERATED
 {an1, an2, an4, an8}
 * resourceConfig-r11
 * subframeConfig-11
 * scrambleingIdentity-r11
- csi-IM-ConfigId-r11
- p-C-AndCBSRList-r11
- cqi-ReportBothProc-r11
- cqi-ReportPeriodicProcId-r11
- cqi-ReportAperiodicProc-r11
 ......
}

The CSI process configuration information can include configuration information (such as CSI process ID (csi-ProcessId-r11), CSI-RS interval, and location (csi-RS-ConfigNZPId-r11)), interference measurement region information for CQI measurement (csi-IM-ConfigId-r11), and CQI feedback interval and transmission region information for use by the UE in feeding back the measurement result on the corresponding CSI-RS (cqi-ReportBothProc-r11, cqi-ReportPeriodicProcId-r11, and cqi-ReportAperiodicProc-r11)).

The UE transmits CSI feedback information at a given feedback interval in a given transmission region based on the CSI-process configuration information, the feedback information including a Rank Indicator (RI) indicating the rank available for the downlink channel, a Precoding Matrix Indicator (PMI) as the channel precoding information, and a Channel Quality Indicator (CQI) for used in precoding the corresponding channel with the matrix indicated by the PMI.

As described above, the LTE release 12 restricts the number of antenna ports, i.e. TxRUs, per CSI process to 8. In order to support more TxRUs for FD-MIMO transmission, it can be necessary to extend the maximum number of antenna ports, i.e., TxRUs, to 16 (two CSI processes), 24 (three CSI processes), or 64 (eight CSI processes) by applying more than one CSI processes.

Meanwhile, the maximum number of CSI processes per UE is limited to 3 in the LTE release 12 standard. This means that the number of TxRUs is limited to 24 even when using the multiple CSI processes. Accordingly, in order to implement a FD-MIMO system supporting the case of using 32 TxRUs or 64 TxRUs, there is a need of a method for reducing extra overhead caused by increased number of channels.

One solution for this is to use a Kronecker-Product-based (KP-based) channel recovery method. For this purpose, it is necessary to use the antenna arrays for the respective horizontal and vertical domains of the channel as the respective TxRU sets and, if transmitting the CSI-RSs corresponding the antenna arrays for the respeicitve horizontal and vertical domains through different CSI processes, it can be possible to estimate channels for all TxRUs using the Kronecker-Product thereof.

FIG. 1 is a diagram illustrating a method for estimating channels using the Kronecker-Product according to an embodiment of the present disclosure. Referring to FIG. 1, independent CSI processes are applied to the horizontal and vertical direction antenna arrays, respectively, one CSI-RS antenna port is allocated to each of the TxRUs constituting one antenna array, and the UE feeds back the channel state information (RI, PMI, and CQI) corresponding to the independent CSI processes.

The V-CSI-RS configuration information 100 is the information for configuring the CSI process corresponding to the vertical antenna array. The V-CSI-RS configuration information 100 includes a CSI process ID for the vertical antenna array (csi-ProcessId-r11) 101, a number of V-CSI-RSs (antennaPortsCount-r11) 102, a CSI-RS position (resourceConfig-r11) 103, and information on CQI feedback interval and transmission region for the UE to measure channels using the corresponding V-CSI-RS (cqi-ReportBothProc-r11, cqi-ReportPeriodicProcId-r11, and cqi-ReportAperiodicProc-r11) 104.

The H-CSI-RS configuration information 110 is the information for configuring the CSI process corresponding to the horizontal antenna array. The H-CSI-RS configuration information 110 includes a CSI process ID for the horizontal antenna array (csi-ProcessId-r11) 111, a number of H-CSI-RSs (antennaPortsCount-r11) 112, a CSI-RS position (resourceConfig-r11) 113, and information on CQI feedback interval and transmission region for the UE to measure channels using the corresponding H-CSI-RS (cqi-ReportBothProc-r11, cqi-ReportPeriodicProcId-r11, and cqi-ReportAperiodicProc-r11) 114.

In the downlink carrying the CSI-RS signaling, the CSI-RSs belonging to the H-CSI-RS processes 120 and 121 are transmitted from the eNB to the UE according to the H-CSI-RS configuration information. The CSI-RSs belonging to the V-CSI-RS processes 130 and 131 are transmitted from the eNB to the UE according to the V-CSI-RS configuration information.

In the uplink carrying the channel state information feedback from the UE to the eNB, the channel state informations generated based on the CSI processes for the vertical antenna array (H-PMI, H-CQI, and H-RI) 140 and 141 are transmitted from the UE to the eNB according to the H-CSI-RS configuration information. The channel state informations generated based on the CSI processes for the vertical antenna array (V-PMI, V-CQI, and V-RI) 150 and 151 are transmitted from the UE to the eNB according to the V-CSI-RS configuration information.

In this case, the eNB performs Kronecker-Product on the $PMI_H$ and $PMI_V$ to recover $PMI_{Joint}$ for all TxRUs in a 3-Dimensional (3D) form with the horizontal and vertical antennas. This can be expressed by equation (1):

$$PMI_{Joint} = PMI_V \otimes PMI_H \quad (1)$$

However, there is no method proposed yet for estimating the channel quality information $CQI_{Joint}$ of all TxRUs in the 3D form. Although it can be considered to multiply $CQI_H$ and $CQI_V$ as shown in equation (2) to acquire $CQI_{Joint}$ simply, the result is very inaccurate.

$$CQI_{Joint} = CQI_H CQI_V \quad (2)$$

The reason for the inaccuracy of equation (2) can be found in equation (3). Since the CQI is based on the Signal-to-interference-plus-Noise Ratio (SINR), equation (3) can be derived by substituting the SINR equation for CQI. $P_{Serv}$ denotes the received signal strength, $NI_{IMR}(k)$ denotes the interference and thermal noise from neighboring cells, H(k) or h(k) denotes a channel between the eNB and the UE, and W or w denotes the precoding matrix. The subscript v denotes that the value is a vertical domain value, and the subscript h denotes that the value is a horizontal domain value. The subscript KP denotes that the value is a 3D or joint domain value.

$$SINR_{Joint}(k) = \frac{P_{serv}\|H_{KP}(k)W_{KP}^H\|^2}{NI_{IMR}(k)} = \frac{P_{serv}|h_v(k)w_v^H|^2|h_h(k)w_h^H|^2}{NI_{IMR}(k)} \quad (3)$$

$$SINR_{V-domain}(k) = \frac{P_{serv}|h_v(k)w_v^H|^2}{NI_{IMR}(k)}$$

$$SINR_{H-domain}(k) = \frac{P_{serv}|h_h(k)w_h^H|^2}{NI_{IMR}(k)}$$

$$SINR_{V-domain}(k) SINR_{H-domain}(k) = \frac{P_{serv}^2|h_v(k)w_v^H|^2|h_h(k)w_h^H|^2}{NI_{IMR}^2(k)}$$

Thus, $$SINR_{Joint}(k) \neq SINR_{V-domain}(k) SINR_{H-domain}(k).$$

As shown in equation (3), in the case of calculating $CQI_{Joint}$ as a production of the $CQI_H$ and $CQI_V$ as shown in equation (2), if the CQI is interpreted as a product of SINRs, it occurs that the product of $CQI_H$ and $CQI_V$ includes the received signal strength $P_{Serv}$ including path loss as a long-term component and the interference and thermal noise $NI_{IMR}(k)$ from the neighboring cells overlappingly. Accordingly, the $CQI_{Joint}$ acquired by equation (2) is a very inaccurate value.

The present disclosure proposes a method for applying a compensation offset for calculating total Joint CQI of the FD-MIMO and a procedure therefor. A description thereof is made with reference to equation (4):

$$CQI_{Joint} = \frac{CQI_V CQI_H}{\alpha_{offset}} \quad (4)$$

If equation (4) is applied in the dB domain which is mainly used to express CQI, equation (5) is derived:

$$CQI_{Joint} [dB] = CQI_V + CQI_H - \alpha_{offset} [dB] \quad (5)$$

In order to acquire $\alpha_{offset}$ from equation (5), four embodiments can be proposed as follows.

The first embodiment is directed to a method for an eNB to determine the information offset $\alpha_{offset}$ with any channel state information. This method is based on a technical statistical value, and the result value can vary depending on the channel condition. Accordingly, the eNB should be designed to store at least one compensation offset value and update the compensation offset value according to the cell environment and FD-MIMO environment. Table 2 shows an example thereof.

TABLE 2

| Per-environment configuration value ($\alpha_{offset}$) | Compensation value (dB) |
|---|---|
| Value 1 | +5 dB |
| Value 2 | +0 dB |
| Value 3 | −5 dB |
| ... | ... |

Second embodiment is directed to a method for the eNB to determine the compensation offset without extra information to reduce the overhead but update the compensation offset based on the positive acknowledgement/negative acknowledgement (ACK/NACK) feedback which the UE transmits in correspondence to downlink data transmitted by the eNB.

Figure 2:
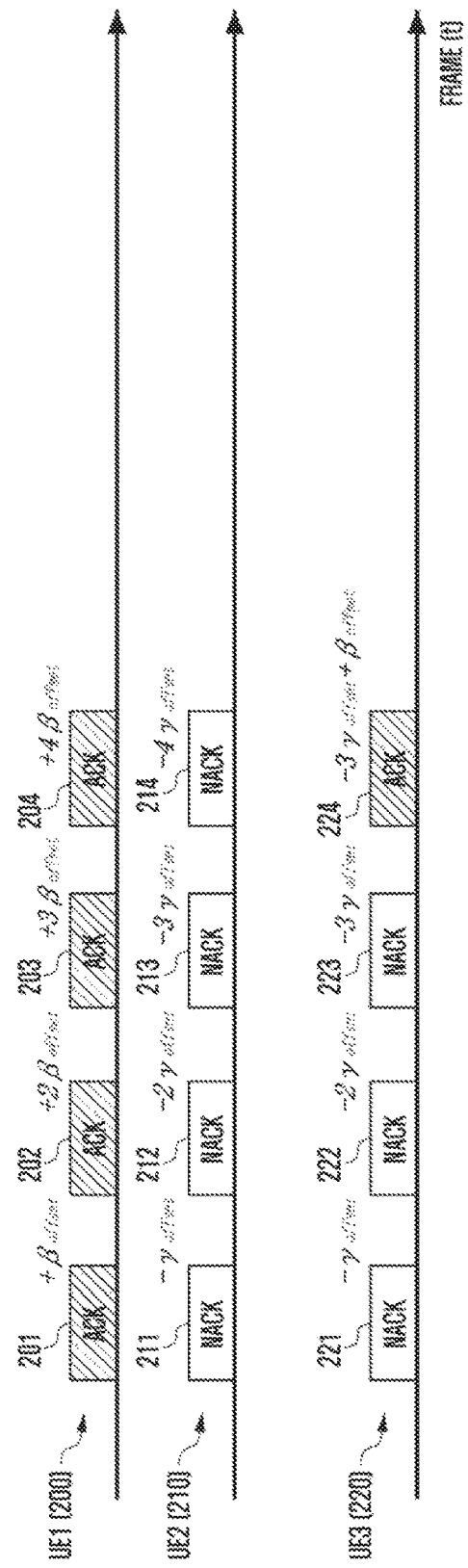
FIG. 2 is diagram illustrating a method for the eNB to adjust the compensation value based on the ACK/NACK feedback from the UE according to an embodiment of the present disclosure.

FIG. 2 is diagram illustrating a method for the eNB to adjust the compensation value based on the ACK/NACK feedback from the UE according to an embodiment of the present disclosure. In FIG. 2, the eNB adds $+\beta_{OFFSET}$ to the compensation offset in the case of receipt of an ACK and $-\gamma_{OFFSET}$ in the case of receipt of a NACK from the UE.

For the case of UE 1 200 from which four ACKs 201, 202, 203, and 204 are received, the eNB adds $+4\beta_{OFFSET}$ to the compensation offset. For the case of UE 2 210 from which four NACKs 211, 212, 213, and 214 are received, the eNB adds $-4\gamma_{OFFSET}$ to the compensation offset. For the case of UE 3 220 from which three NACKs 211, 222, and 223 and one ACK 224 are received, the eNB adds $+\beta_{OFFSET}$ and $-3\gamma_{OFFSET}$ to the compensation offset. The eNB adds the compensation values $\beta_{OFFSET}$ and $\gamma_{OFFSET}$ for the ACK and NACK feedbacks corresponding to the transmitted packets in an accumulative manner to acquire a final compensation value.

This can be expressed by equation (6):

$$\alpha_{offset}(n) = \alpha_{offset}(n-1) + \delta(n) \quad (6)$$

δ(n) is +$β_{OFFSET}$ for ACK corresponding to the previous packet;

−$γ_{OFFSET}$ for NACK corresponding to previous packet

The UE can feed back the joint CQI reflecting the compensation offset values received from the eNB according to the first and second embodiments to the eNB and, if the UE reports the joint CQI calculated by equation (2), the eNB can recalculate the joint CQI by reflecting the compensation offset. The eNB can calculate the joint CQI based on the $CQI_H$ and $CQI_V$ reported by the UE. The UE can calculate the compensation value autonomously according to the first and second embodiments and reflects the compensation value for calculating the joint CQI, which is fed back to the eNB. The third and fourth embodiments are characterized by extra CSI processes and feedbacks so as to increase CSI process configuration and CSI-RS transmission overhead in comparison with the first and second embodiments but advantageous in terms of improving accuracy of the joint CQI for the 3D channel. The third and fourth embodiments can use the same CSI process with the exception of using different formulas for calculating the joint CQI.

Figure 3:
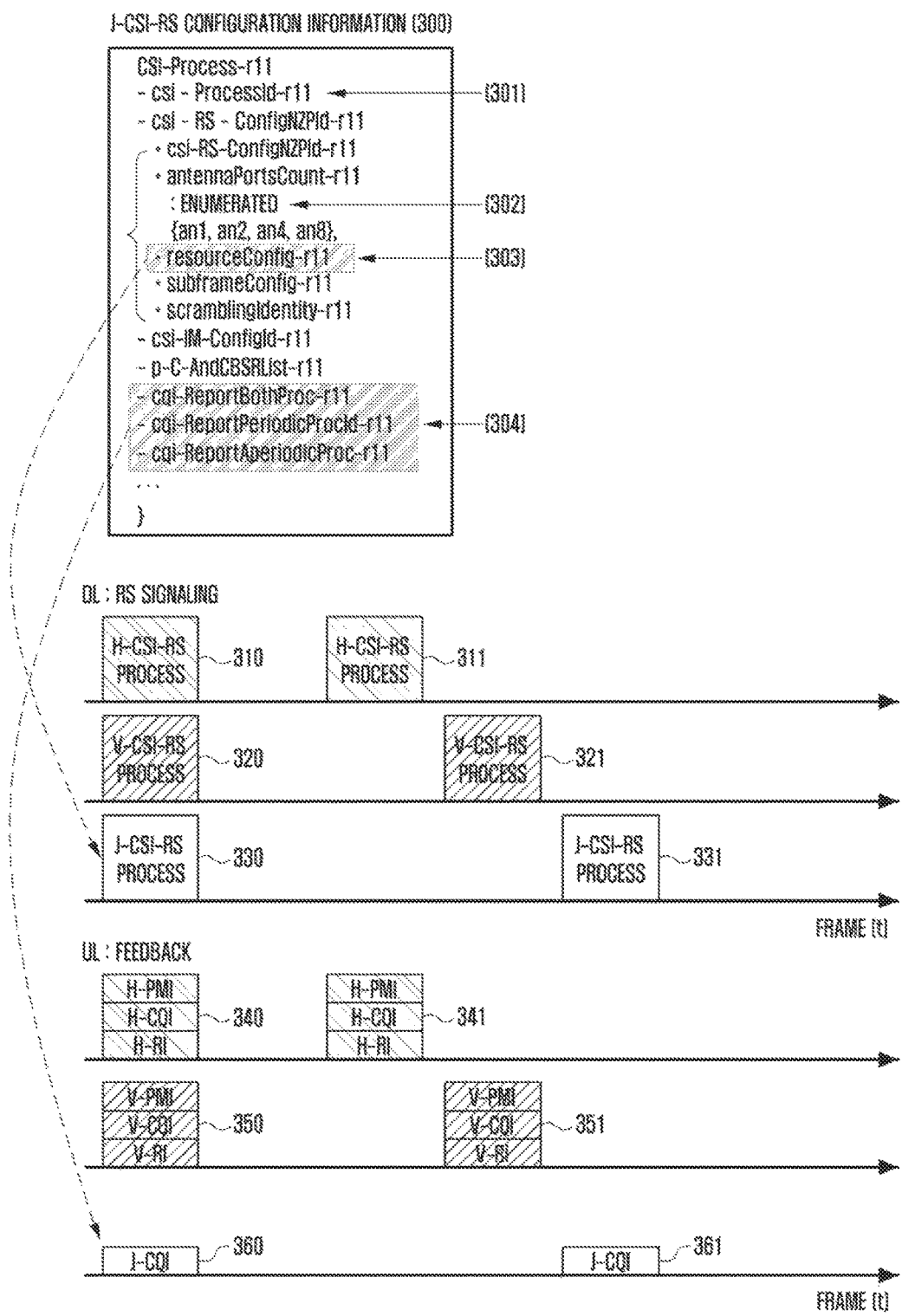
FIG. 3 is a diagram illustrating a CSI process for calculating the joint CQI according to the third and fourth embodiments of the present disclosure.

FIG. 3 is a diagram illustrating a CSI process for calculating the joint CQI according to the third and fourth embodiments of the present disclosure. Referring to FIG. 3, the CSI processes 320 and 321 for the vertical antenna array and the CSI processes 310 and 311 for the horizontal antenna array are configured based on the V-CSI-RS configuration information and H-CSI-RS configuration information as shown in FIG. 1, and the eNB transmits the CSI-RS according to the CSI processes. The UE transmits to the eNB the channel state information generated based on the CSI processes for the vertical antenna array (V-PMI, V-CQI, and V-RI) 350 and 351 and the channel state information generated based on the CSI processes for the horizontal antenna array (H-PMI, H-CQI, and H-RI) 340 and 341.

In FIG. 3, the J-CSI-RS processes 330 and 331 are further configured based on the J-CSI-RS configuration information 300. The J-CSI-RS configuration information includes a CSI process ID for calculating the joint CQI with other configuration information (csi-ProcessId-r11) 301, a number of J-CSI-RSs (antennaPortsCount-r11) 302, a CSI-RS position (resourceConfig-r11) 303, and information on CQI feedback interval and transmission region for the UE to measure channels using the corresponding J-CSI-RS (CQI-Report-BothProc-r11, cqi-ReportPeriodicProcId-r11, and cqi-ReprotAperiodicProc-r11) 304. At this time, the difference from the other configuration information is that the number of J-CSI-RS antenna ports is preset to 1. The UE also transmit the channel state information of J-CQIs 360 and 361 to the eNB according to the J-CSI-RS configuration information. The on-antenna port indicated by the J-CSI-RS configuration information can be an antenna port crossing the horizontal antenna array and vertical antenna array or an arbitrary antenna port.

The CSI process added in FIG. 3 is a CSI process for acquiring a compensation value for the product of $CQI_H$ and $CQI_V$ of equation 2, and the UE can transmit the CQI information feedback concerning one extra antenna port to the eNB.

A method for calculating the joint CQI with an additional CSI process according to the third embodiment for is expressed by equation (7):

$$CQI_{Joint}[dB] = CQI_V + CQI_H - CQI_{1\text{-}port}[dB] \quad (7)$$

Equation (7) is based on equation (8). $P_{Serv}$ denotes the received signal strength, $NI_{IMR}(k)$ denotes the interference and thermal noise from neighboring cells, H(k) or h(k) denotes a channel between the eNB and the UE, and W or w denotes the precoding matrix. The subscript v denotes that the value is a vertical domain value, and the subscript h denotes that the value is a horizontal domain value. The subscript KP denotes that the value is a 3D or joint domain value. The subscript 1-port denotes that the value corresponds to one antenna port configured based on the J-CSI-RS configuration information.

SINR at the $k^{th}$ tone for calculating CQI:

$$SINR_{Joint}(k) = \frac{P_{Serv}\|H_{KP}(k)W_{KP}^H\|^2}{NI_{IMR}(k)} = \frac{P_{Serv}|h_v(k)w_v^H|^2|h_h(k)w_h^H|^2}{NI_{IMR}(k)} \quad (8)$$

$$SINR_{V\text{-}domain}(k) = \frac{P_{Serv}|h_v(k)w_v^H|^2}{NI_{IMR}(k)}$$

$$SINR_{H\text{-}domain}(k) = \frac{P_{Serv}|h_h(k)w_h^H|^2}{NI_{IMR}(k)}$$

$$SINR_{1\text{-}Port}(k) = \frac{P_{Serv}|h_{1\text{-}Port}(k)h_{1\text{-}Port}^H(k)|^2}{NI_{IMR}(k)} \approx \frac{P_{Serv}}{NI_{IMR}(k)}$$

Using the above SINR, the joint SINR is expressed as follows:

$$SINR_{Joint}(k) = SINR_{V\text{-}domain}(k)SINR_{H\text{-}domain}(k)/SINR_{1\text{-}Port}(k)$$

In the dB domain, the joint SINR is expressed as follows:

$$SINR_{Joint}(k)[dB] = SINR_{V\text{-}domain}(k) + SINR_{H\text{-}domain}(k) - SINR_{1\text{-}Port}(k)$$

A method for calculating the joint CQI based on the effective SINR using a total channel capacity according to the fourth embodiment shows the highest accuracy among the four embodiments. According to the fourth embodiment, the joint CQI is calculated by equation (9):

$$SINR_{effective,Joint} = \frac{(1 + SINR_{effective,V\text{-}domain})(1 + SINR_{effective,H\text{-}domain})}{(1 + SINR_{effective,1\text{-}Port})} - 1 \quad (9)$$

Equation (9) is based on equation (10). Capacity denotes the channel capacity, and ⊗ denotes Kronecker-Product. $P_{Serv}$ denotes the received signal strength, $NI_{IMR}(k)$ denotes the interference and thermal noise from neighboring cells, H(k) or h(k) denotes a channel between the eNB and the UE, and W or w denotes the precoding matrix. The subscript v denotes that the value is a vertical domain value, and the subscript h denotes that the value is a horizontal domain value. The subscript KP denotes that the value is a 3D or joint domain value. The subscript 1-port denotes that the value corresponds to one antenna port configured based on the J-CSI-RS configuration information.

$$Capacity_{effective,JOINT} = \sum_{k=0}^{K-1} \log_2\left(1 + \frac{P_{Serv}\|H_{KP}(k)W_{KP}^H\|^2}{NI_{IMR}(k)}\right) \quad (10)$$

if $H_{KP}(k) = h_v(k) \otimes h_h(k),$ $W_{KP} = w_v \otimes w_h$ $\|H_{KP}(k)W_{KP}^H\|^2 = \|(h_v(k) \otimes h_h(k))(w_v^H \otimes w_h^H)\|^2$ By nature of the Kronecker-Product, the following equation is provided:

$$\|(h_v(k) \otimes h_h(k))(w_v^H \otimes w_h^H)\|^2 = \|(h_v(k)w_v^H)(h_h(k)w_h^H)\|^2$$

Meanwhile, the horizontal channel (H) and vertical channel (V) and product of their PMIs can derive an integer value.

$$(h_v(k)w_v^H) = \alpha_v e^{j\theta_v}(1 \times N_{TxV})(N_{TxV} \times 1) = (1 \times 1)(\text{number of rows} \times \text{number of columns of matrix})$$

$$(h_h(k)w_h^H) = \alpha_h e^{j\theta_h}(1 \times N_{TxH})(N_{TxH} \times 1) = (1 \times 1)$$

then, $\|H_{KP}(k)W_{KP}^H\|^2 = \|(h_v(k)w_v^H)(h_h(k))w_h^H\|^2 = |\alpha_v e^{j\theta_v} \alpha_h e^{j\theta_h}|^2 = |\alpha_v e^{j\theta_v}|^2 |\beta_h e^{j\theta_h}|^2 = |h_v(k)w_v^H|^2 |h_h(k)w_h^H|^2$ thus, $\|(h_v(k)w_v^H)(h_h(k)w_h^H)\|^2 = |h_v(k)w_v^H|^2 |h_h(k)w_h^H|^2$ Finally, the total channel capacity is:

$$Capacity_{effective,JOINT} = \sum_{k=0}^{K-1} \log_2\left(1 + \frac{P_{Serv}|h_v(k)w_v^H|^2 |h_h(k)w_h^H|^2}{NI_{IMR}(k)}\right)$$

At this time, if $$Q_k = \frac{P_{Serv}}{NI_{IMR}(k)}, \; X_k = |h_v w_v^H|^2, \; Y_k = |h_h w_h^H|^2,$$

The joint CQI is expressed as $Capacity_{effective,JOINT} = \sum_{k=0}^{K-1} \log_2(1 + Q_k X_k Y_k)$ and the value inside the parentheses of the log formula can be written as follows:

$$1 + Q_k X_k Y_k \times \frac{1 + Q_k}{1 + Q_k} = \frac{1 + Q_k + Q_k X_k Y_k + Q_k^2 X_k Y_k}{1 + Q} =$$

$$\frac{1 + Q_k + Q_k X_k Y_k - \{Q_k X_k + Q_k Y_k\} + \{Q_k X_k + Q_k Y_k\} + Q_k^2 X_k Y_k}{1 + Q} =$$

$$\frac{[Q_k + Q_k X_k Y_k - \{Q_k X_k + Q_k Y_k\}] +}{1 + Q} =$$

$$\frac{[1 + \{Q_k X_k + Q_k Y_k\} + Q_k^2 X_k Y_k]}{1 + Q} =$$

$$\frac{Q_k[(1 - X_k)(1 - Y_k)] + [(1 + Q_k X_k)((1 + Q_k Y_k))]}{1 + Q_k} =$$

$$\frac{Q_k}{1 + Q_k}(1 - X_k)(1 - Y_k) + \frac{(1 + Q_k X_k)((1 + Q_k Y_k))}{1 + Q_k}.$$

This can be reduced to the original form of equation as follows:

$$Capacity_{effective,JOINT} =$$

$$\sum_{k=0}^{K-1} \log_2 \left\{ \frac{P_{Serv}}{P_{Serv} + NI_{IMR}(k)}(1 - |h_v(k)w_v^H|^2)(1 - |h_h(k)w_h^H|^2) + \right.$$

$$\left. \frac{\left[\left(1 + \frac{P_{Serv}}{NI_{IMR}(k)}|h_v(k)w_v^H|^2\right)\left(1 + \frac{P_{Serv}}{NI_{IMR}(k)}|h_h(k)w_h^H|^2\right)\right]}{1 + \frac{P_{Serv}}{NI_{IMR}(k)}} \right\}$$

if $\frac{P_{Serv}}{P_{Serv} + NI_{IMR}(k)}(1 - |h_v(k)w_v^H|^2)(1 - |h_h(k)w_h^H|^2) = 0$, $$Capacity_{effective,JOINT} \approx$$

$$\sum_{k=0}^{K-1} \log_2 \left\{ \frac{\left[\left(1 + \frac{P_{Serv}}{NI_{IMR}(k)}|h_v(k)w_v^H|^2\right)\left(1 + \frac{P_{Serv}}{NI_{IMR}(k)}|h_h(k)w_h^H|^2\right)\right]}{1 + \frac{P_{Serv}}{NI_{IMR}(k)}} \right\} =$$

$$\sum_{k=0}^{K-1} \log_2\left(1 + \frac{P_{Serv}}{NI_{IMR}(k)}|h_v(k)w_v^H|^2\right) +$$

$$\sum_{k=0}^{K-1} \log_2\left(1 + \frac{P_{Serv}}{NI_{IMR}(k)}|h_h(k)w_h^H|^2\right) - \sum_{k=0}^{K-1} \log_2\left(1 + \frac{P_{Serv}}{NI_{IMR}(k)}\right)$$

Meanwhile, $$Capacity_{effective,V-domain} =$$

$$\sum_{k=0}^{K-1} \log_2\left(1 + \frac{P_{Serv}|h_v(k)w_v^H|^2}{NI_{IMR}(k)}\right) = K\log_2(1 + SINR_{effective,V-domain})$$

$$Capacity_{effective,H-domain} =$$

$$\sum_{k=0}^{K-1} \log_2\left(1 + \frac{P_{Serv}|h_h(k)w_h^H|^2}{NI_{IMR}(k)}\right) = K\log_2(1 + SINR_{effective,H-domain})$$

$$Capacity_{effective,1-Port} = \sum_{k=0}^{K-1} \log_2\left(1 + \frac{P_{Serv}|h_{1-Port}(k)h_{1-Port}^H(k)|^2}{NI_{IMR}(k)}\right) \approx$$

$$\sum_{k=0}^{K-1} \log_2\left(1 + \frac{P_{Serv}}{NI_{IMR}(k)}\right) \approx \sum_{k=0}^{K-1} \log_2\left(1 + \frac{P_{Serv}}{NI_{IMR}(k)}\right) =$$

$$K\log_2(1 + SINR_{effective,1-Port})$$

and thus, finally $$Capacity_{effective,JOINT} \approx Capacity_{effective,V-domain} + Capacity_{effective,H-domain} - Capacity_{effective,1-Port}$$

Accordingly, the joint CQI is expressed as:

$K \log_2(1 + SINR_{effective,Joint}) = K \log_2(1 + SINR_{effective,V-domain}) + K \log_2(1 + SINR_{effective,H-domain}) - K \log_2(1 + SINR_{effective,1-Port})$ and, if removing K in both terms, $$\log_2(1 + SINR_{effective,Joint}) =$$

$$\log_2 \frac{(1 + SINR_{effective,V-domain})(1 + SINR_{effective,H-domain})}{(1 + SINR_{effective,1-Port})}$$

$$1 + SINR_{effective,Joint} = \frac{(1 + SINR_{effective,V-domain})(1 + SINR_{effective,H-domain})}{(1 + SINR_{effective,1-Port})}.$$

Finally, the joint CQI is expressed as follows:

$$SINR_{effective,Joint} = \frac{(1 + SINR_{effective,V-domain})(1 + SINR_{effective,H-domain})}{(1 + SINR_{effective,1-Port})} - 1$$

It is possible to estimate the joint CQI according to one of the four embodiments.

Figure 4:
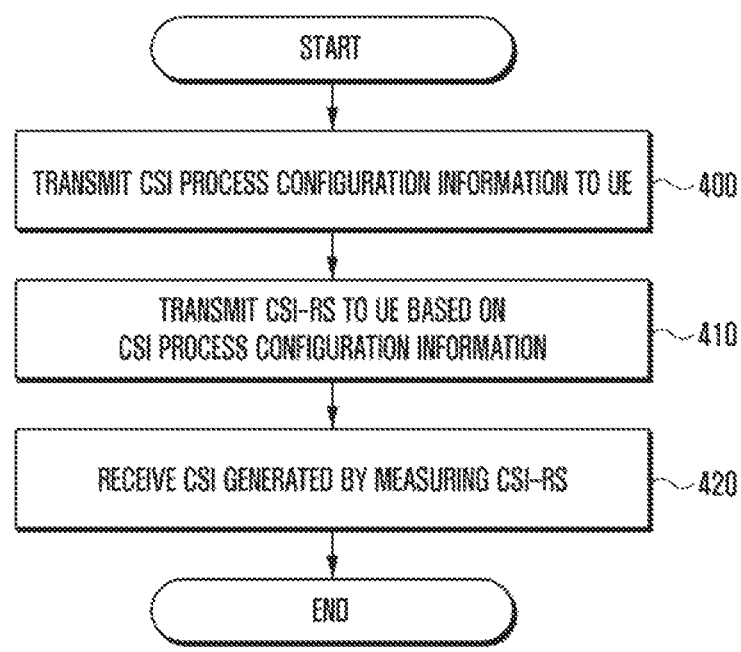
FIG. 4 is a flowchart illustrating a method for an eNB to receive channel state information from a UE according to an embodiment of the present disclosure.

FIG. 4 is a flowchart illustrating a method for an eNB to receive channel state information from a UE according to an embodiment of the present disclosure. Referring to FIG. 4, the eNB sends the UE the CSI process configuration information at step 400. The CQI process configuration information can include at least one of the V-CSI-RS configuration information, H-CSI-RS configuration information, and J-CSI-RS configuration as described with reference to FIGS. 1 and 3. The eNB can further send the UE a compensation offset value calculated according to one of the first and second embodiments. The eNB sends the UE the CSI-RS according to the content of the CSI process configuration information at step 410.

The eNB receives channel state information generated based on the CSI-RS measurement from the UE at step 420. The channel state information can include a CQI value for one antenna port or joint CQI as well as horizontal and vertical domains PMIs, CQIs, and RIs. The eNB can calculate joint CQI by reflecting the compensation offset based on the received channel state information according to one of the first and second embodiments or based on the channel state information for one antenna port according to one of the third and fourth embodiments.

Figure 5:
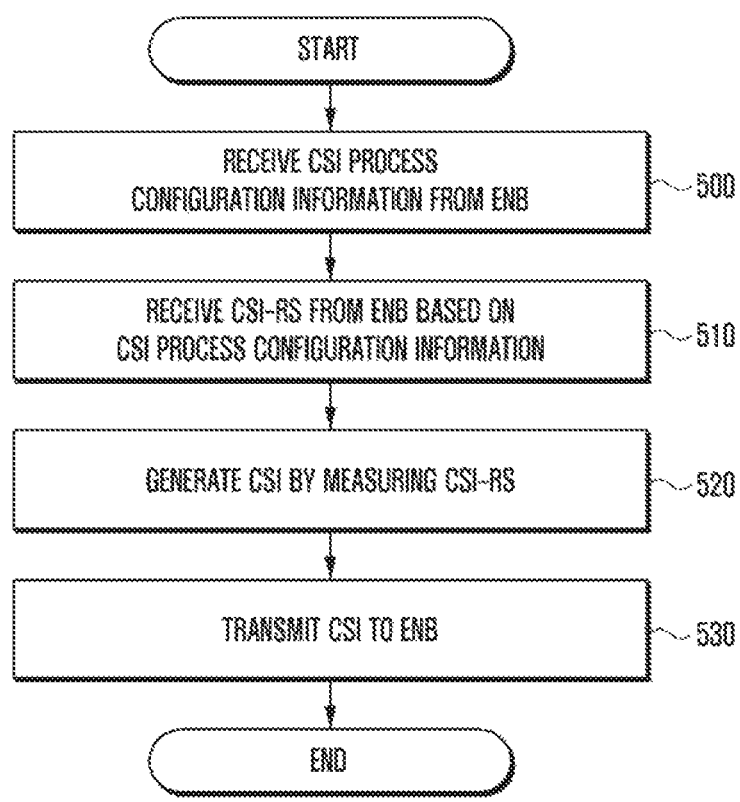
FIG. 5 is a flowchart illustrating a method for a UE to transmit channel state information to an eNB according to an embodiment of the present disclosure.

FIG. 5 is a flowchart illustrating a method for a UE to transmit channel state information to an eNB according to an embodiment of the present disclosure. Referring to FIG. 5, the UE receives CSI process configuration transmitted by the eNB at step 500. The CSI process configuration information can include at least one of the V-CSI-RS configuration information, H-CSI-RS configuration information, and J-CSI-RS configuration as described with reference to FIGS. 1 and 3. The UE can further receive a compensation offset value calculated according to one of the first and second embodiments from the eNB. The UE receives the CSI-RS from the eNB according to the content of the CSI process configuration information. at step 510

The UE generates channel state information based on the CSI-RS measurement result at step 520. At this time, the UE can calculate the joint CQI according to one of the first to fourth embodiments. Particularly, the UE can measure SINR or CQI for one antenna port to calculate the joint CQI.

The UE sends the eNB the generated channel state information at step 530. The channel state information can include a CQI value, SINR value for one antenna port or joint CQI as well as horizontal and vertical domains PMIs, CQIs, and RIs. At this time, the eNB can calculate the joint CQI based on the channel information received from the UE.

Figure 6:
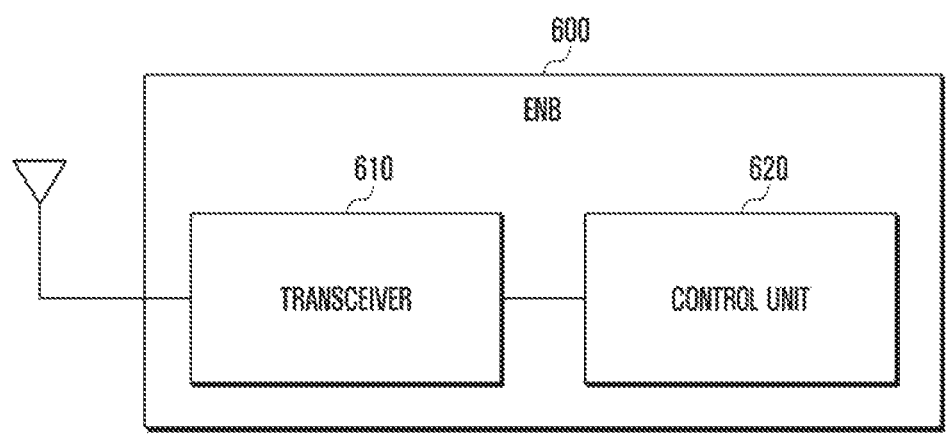
FIG. 6 is a block diagram illustrating a configuration of an eNB according to an embodiment of the present disclosure.

FIG. 6 is a block diagram illustrating a configuration of an eNB according to an embodiment of the present disclosure. As shown in FIG. 6, the eNB 600 includes a transceiver 610 and a control unit 620. The transceiver 610 communicates signals with a UE, i.e. the eNB 600 transmits CSI process configuration information and CSI-RS to the UE and receives channel status information transmitted by the UE. The control unit 620 configures CSI processes and controls the operation of the transceiver 610. The control unit 620 can also calculate a joint CQI.

Figure 7:
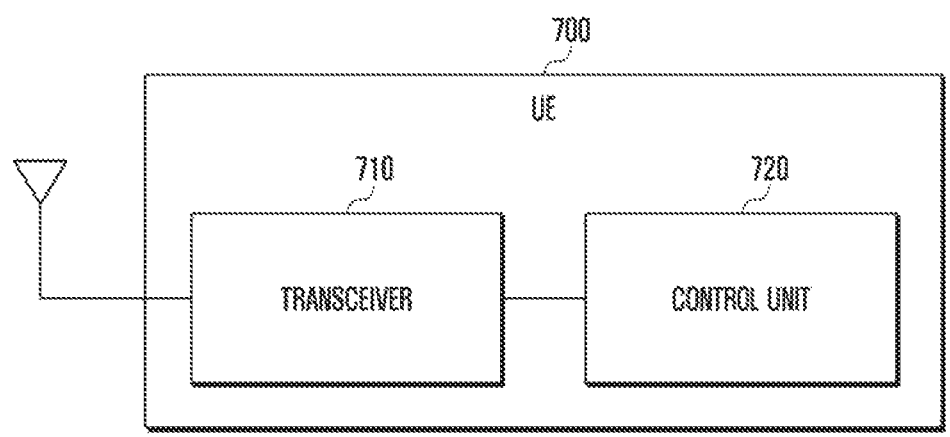
FIG. 7 is a block diagram illustrating a configuration of a UE according to an embodiment of the present disclosure.

FIG. 7 is a block diagram illustrating a configuration of a UE according to an embodiment of the present disclosure. As shown in FIG. 7, the UE 700 includes a transceiver 710 and a control unit 720. The transceiver 710 communicates signals with an eNB, i.e., the transceiver 710 receives CSI process configuration information and CSI-RS from the eNB and transmits channel state information generated based on the CSI-process configuration information to the eNB. The control unit 720 measures the CSI-RS and generates the channel state information based on the measurement result. At this time, the channel state information can include joint CQI as well as horizontal and vertical domains PMIs, CQIs, and RIs.

As described above, the CSI measurement and report method and apparatus of the present disclosure is advantageous in terms of allowing the LTE release 12 or earlier release eNB and UE to perform FD-MIMO channel measurement and CSI report.

Although the present disclosure has been described with an exemplary embodiment, various changes and modifications can be suggested to one skilled in the art. It is intended that the present disclosure encompass such changes and modifications as fall within the scope of the appended claims.

What is claimed is:

1. A method for a base station to receive channel state information (CSI) in a wireless communication system, the method comprising:
transmitting CSI process configuration information to a terminal;
transmitting a CSI Reference Signal (CSI-RS) to the terminal based on the CSI process configuration information; and
receiving the CSI generated based on CSI-RS measurement result from the terminal,
wherein the CSI process configuration information includes first configuration information for configuring a first CSI process to measure channel states of antenna array of a first direction and a second CSI process to measure channel states of antenna array of a second direction and second configuration information for configuring a third CSI process to measure a channel state of one antenna port, and
wherein the CSI includes a joint Channel Quality Indicator (CQI) that is determined based on both CQIs of the antenna arrays of the first direction and the second direction based on the first CSI process and the second CSI process and a CQI of the one antenna port based on the third CSI process, and
wherein the joint CQI is determined by an equation:

$$CQI_{joint}\ [dB] = CQI_1 + CQI_2 - CQI_{1\text{-}port}\ [dB]$$

where $CQI_1$ denotes the CQI for the antenna array of the first direction, $CQI_2$ denotes the CQI for the antenna array of the second direction, and $CQI_{1\text{-}Port}$ denotes the CQI for the one antenna port.

2. The method of claim 1, wherein the one antenna port is an overlapped antenna port between the antenna arrays of the first direction and the second direction or an arbitrary antenna port.

3. A method for a terminal to transmit Channel State Information (CSI) in a wireless communication system, the method comprising:
receiving CSI process configuration information from a base station;
receiving a CSI Reference Signal (CSI-RS) generated based on the CSI process configuration information from the base station; and
transmitting the CSI generated based on CSI-RS measurement result to the base station,
wherein the CSI process configuration information includes first configuration information for configuring a first CSI process to measure channel states of antenna array of a first direction and a second CSI process to measure channel states of antenna array of a second direction and second configuration information for configuring a third CSI process to measure a channel state of one antenna port, and
wherein the CSI includes a joint Channel Quality Indicator (CQI) that is determined based on both CQIs of the antenna arrays of the first direction and the second direction based on the first CSI process and the second CSI process and a CQI of the one antenna port based on the third CSI process, and wherein the joint CQI is determined by an equation:

$$CQI_{joint} [dB]=CQI_1+CQI_2-CQI_{1\text{-}port} [dB]$$

where $CQI_1$ denotes the CQI for the antenna array of the first direction, $CQI_2$ denotes the CQI for the antenna array of the second direction, and $CQI_{1\text{-}Port}$ denotes the CQI for the one antenna port.

4. The method of claim 3, wherein the one antenna port is an overlapped antenna port between the antenna arrays of the first direction and the second direction or an arbitrary antenna port.

5. A base station for receiving Channel State Information (CSI) in a wireless communication system, the base station comprising:
 a transceiver configured to transmit and receive signals to and from a terminal; and
 a control unit coupled with the transceiver and configured to:
  to transmit CSI process configuration information to a terminal, transmit a CSI Reference Signal (CSI-RS) to the terminal based on the CSI process configuration information, and
  receive the CSI generated based on CSI-RS measurement result from the terminal,
   wherein the CSI process configuration information includes first configuration information for configuring a first CSI process to measure channel states of antenna array of a first direction and a second CSI process to measure channel states of antenna array of a second direction and second configuration information for configuring a third CSI process to measure a channel state of one antenna port, and
 wherein the CSI includes a joint Channel Quality Indicator (CQI) that is determined based on both CQIs of the antennas arrays of the first direction and the second direction based on the first CSI process the second CSI process and a CQI of the one antenna port based on the third CSI process, and
 wherein the joint CQI is determined by an equation:

$$CQI_{joint} [dB]=CQI_1+CQI_2-CQI_{1\text{-}port} [dB]$$

where $CQI_1$ denotes the CQI for the antenna array of the first direction, $CQI_2$ denotes the CQI for the antenna array of the second direction, and $CQI_{1\text{-}Port}$ denotes the CQI for the one antenna port.

6. The base station of claim 5, wherein one antenna port is an overlapped antenna port between the antenna arrays of the first direction and the second direction or an arbitrary antenna port.

7. A terminal for transmitting Channel State Information (CSI) in a wireless communication system, the terminal comprising:
 a transceiver configured to transmit and receive signals to and from a base station; and
 a control unit coupled with the transceiver and configured to:
  to receive CSI process configuration information from a base station, receive a CSI Reference Signal (CSI-RS) generated based on the CSI process configuration information from the base station, and
  transmit the CSI generated based on CSI-RS measurement result to the base station,
   wherein the CSI process configuration information includes first configuration information for configuring a first CSI process to measure channel states of antenna array of a first direction and a second CSI process to measure channel states of antenna array of a second direction and second configuration information for configuring a third CSI process to measure a channel state of one antenna port, and
 wherein the CSI includes a joint Channel Quality Indicator (CQI) that is determined based on both CQIs of the antennas arrays of the first direction and the second direction based on the first CSI process and the second CSI process and a CQI of the one antenna port based on the second CSI process, and
 wherein the joint CQI is determined by an equation:

$$CQI_{joint} [dB]=CQI_1+CQI_2-CQI_{1\text{-}port} [dB]$$

where $CQI_1$ denotes the CQI for the antenna array of the first direction, $CQI_2$ denotes the CQI for the antenna array of the second direction, and $CQI_{1\text{-}Port}$ denotes the CQI for the one antenna port.

8. The terminal of claim 7, wherein one antenna port is an overlapped antenna port between the antenna arrays of the first direction and the second direction or an arbitrary antenna port.

9. A method for a base station to receive channel state information (CSI) in a wireless communication system, the method comprising:
 transmitting CSI process configuration information to a terminal;
 transmitting a CSI Reference Signal (CSI-RS) to the terminal based on the CSI process configuration information; and
 receiving the CSI generated based on CSI-RS measurement result from the terminal,
  wherein the CSI process configuration information includes first configuration information for configuring a first CSI process to measure channel states of antenna array of a first direction and a second CSI process to measure channel states of antenna array of a second direction and second configuration information for configuring a third CSI process to measure a channel state of one antenna port, and
 wherein the CSI includes a joint Channel Quality Indicator (CQI) that is determined based on both CQIs of the antenna arrays of the first direction and the second direction based on the first CSI process and the second CSI process and a CQI of the one antenna port based on the third CSI process, and
 wherein the joint CQI is determined based on signal to interference noise ratio (SINR)$_{effective,joint}$ of a following equation:

$$SINR_{effective,joint} = \frac{(1+SINR_{effective,1-domain})(1+SINR_{effective,2-domain})}{(1+SINR_{effective,1-port})},$$

where $SINR_{effective,1-domain}$ is derived from the CQI for the antenna array of the first direction, $SINR_{effective,2-domain}$ is derived from the CQI for the antenna array of the second direction, and $SINR_{effective,1-port}$ is derived from the CQI for one antenna port.

10. The method of claim 9, wherein the one antenna port is an overlapped antenna port between the antenna arrays of the first direction and the second direction or an arbitrary antenna port.

11. A method for a terminal to transmit Channel State Information (CSI) in a wireless communication system, the method comprising:
 receiving CSI process configuration information from a base station;

receiving a CSI Reference Signal (CSI-RS) generated based on the CSI process configuration information from the base station; and transmitting the CSI generated based on CSI-RS measurement result to the base station, wherein the CSI process configuration information includes first configuration information for configuring a first CSI process to measure channel states of antenna array of a first direction and a second CSI process to measure channel states of antenna array of a second direction and second configuration information for configuring a third CSI process to measure a channel state of one antenna port, and wherein the CSI includes a joint Channel Quality Indicator (CQI) that is determined based on both CQIs of the antenna arrays of the first direction and the second direction based on the first CSI process and the second CSI process and a CQI of the one antenna port based on the third CSI process, and wherein the joint CQI is determined based on signal to interference noise ratio (SINR)$_{effective,joint}$ of a following equation:

$$SINR_{effective,joint} = \frac{(1 + SINR_{effective,1-domain})(1 + SINR_{effective,2-domain})}{(1 + SINR_{effective,1-port})},$$

where SINR$_{effective,1-domain}$ is derived from the CQI for the antenna array of the first direction, SINR$_{effective,2-domain}$ is derived from the CQI for the antenna array of the second direction, and SINR$_{effective,1-port}$ is derived from the CQI for one antenna port.

12. The method of claim 11, wherein the one antenna port is an overlapped antenna port between the antenna arrays of the first direction and the second direction or an arbitrary antenna port.

13. A base station for receiving Channel State Information (CSI) in a wireless communication system, the base station comprising:

a transceiver configured to transmit and receive signals to and from a terminal; and a control unit coupled with the transceiver and configured to:

to transmit CSI process configuration information to a terminal, transmit a CSI Reference Signal (CSI-RS) to the terminal based on the CSI process configuration information, and receive the CSI generated based on CSI-RS measurement result from the terminal, wherein the CSI process configuration information includes first configuration information for configuring a first CSI process to measure channel states of antenna array of a first direction and a second CSI process to measure channel states of antenna array of a second direction and second configuration information for configuring a third CSI process to measure a channel state of one antenna port, and wherein the CSI includes a joint Channel Quality Indicator (CQI) that is determined based on both CQIs of the antennas arrays of the first direction and the second direction based on the first CSI process the second CSI process and a CQI of the one antenna port based on the third CSI process, and wherein the joint CQI is determined based on signal to interference noise ratio (SINR)$_{effective,joint}$ of a following equation:

$$SINR_{effective,joint} = \frac{(1 + SINR_{effective,1-domain})(1 + SINR_{effective,2-domain})}{(1 + SINR_{effective,1-port})},$$

where SINR$_{effective,1-domain}$ is derived from the CQI for the antenna array of the first direction, SINR$_{effective,2-domain}$ is derived from the CQI for the antenna array of the second direction, and SINR$_{effective,1-port}$ is derived from the CQI for one antenna port.

14. The base station of claim 13, wherein one antenna port is an overlapped antenna port between the antenna arrays of the first direction and the second direction or an arbitrary antenna port.

15. A terminal for transmitting Channel State Information (CSI) in a wireless communication system, the terminal comprising:

a transceiver configured to transmit and receive signals to and from a base station; and a control unit coupled with the transceiver and configured to:

to receive CSI process configuration information from a base station, receive a CSI Reference Signal (CSI-RS) generated based on the CSI process configuration information from the base station, and transmit the CSI generated based on CSI-RS measurement result to the base station, wherein the CSI process configuration information includes first configuration information for configuring a first CSI process to measure channel states of antenna array of a first direction and a second CSI process to measure channel states of antenna array of a second direction and second configuration information for configuring a third CSI process to measure a channel state of one antenna port, and wherein the CSI includes a joint Channel Quality Indicator (CQI) that is determined based on both CQIs of the antennas arrays of the first direction and the second direction based on the first CSI process and the second CSI process and a CQI of the one antenna port based on the second CSI process, and wherein the joint CQI is determined based on signal to interference noise ratio (SINR)$_{effective,joint}$ of a following equation:

$$SINR_{effective,joint} = \frac{(1 + SINR_{effective,1-domain})(1 + SINR_{effective,2-domain})}{(1 + SINR_{effective,1-port})},$$

where SINR$_{effective,1-domain}$ is derived from the CQI for the antenna array of the first direction, SINR$_{effective,2-domain}$ is derived from the CQI for the antenna array of the second direction, and SINR$_{effective,1-port}$ is derived from the CQI for one antenna port.

16. The terminal of claim 15, wherein one antenna port is an overlapped antenna port between the antenna arrays of the first direction and the second direction or an arbitrary antenna port.

* * * * *